Dec. 29, 1925.
Re. 16,238
G. THOMPSON
GUN REST FOR SPORTSMEN
Original Filed Oct. 14, 1922
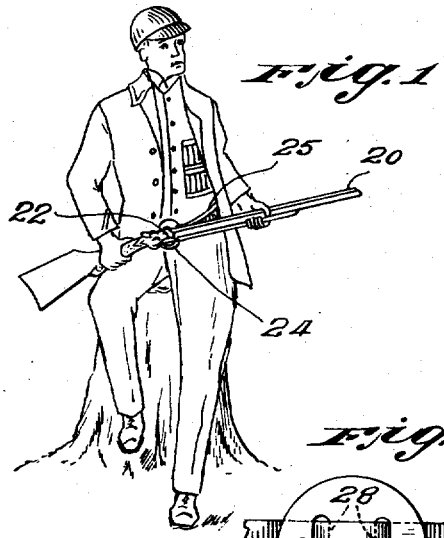
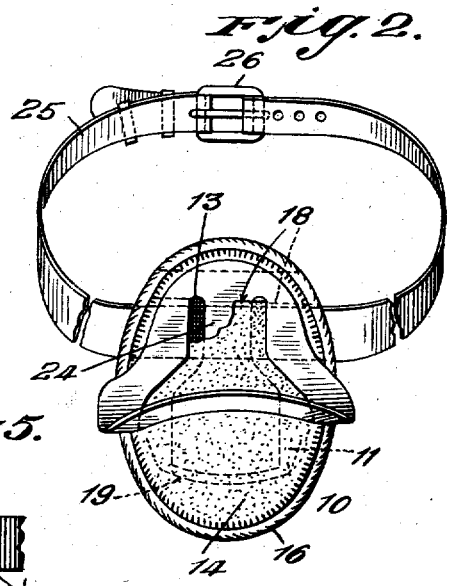
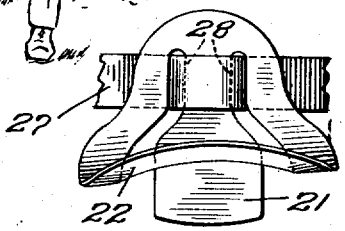
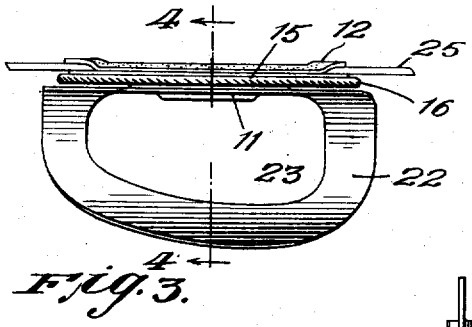
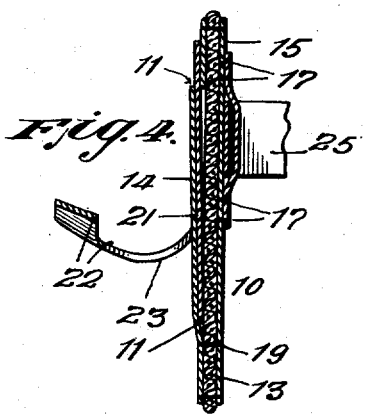
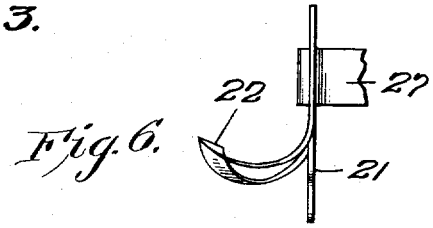
INVENTOR
GEORGE THOMPSON
BY William P. Hammond
ATTORNEY Reissued Dec. 29, 1925. Re. 16,238

UNITED STATES PATENT OFFICE.

GEORGE THOMPSON, OF NEW YORK, N. Y.

GUN REST FOR SPORTSMEN.

Original No. 1,469,285, dated October 2, 1923, Serial No. 594,426, filed October 14, 1922. Application for reissue filed August 28, 1924. Serial No. 734,808.

*To all whom it may concern:*

Be it known that I, GEORGE THOMPSON, a subject of the King of Great Britain, and resident of the borough of Manhattan, in the city, county, and State of New York, have invented an Improvement in Gun Rests for Sportsmen, of which the following is a specification.

My invention relates to a device for supporting a gun carried by sportsmen while hunting game, and is particularly adapted for use in hunting birds quick on the wing, such as woodcock, partridge and quail, and the object of the invention is not only to relieve the huntsman's arms from the weight of the gun, but to support the gun in such position that a quick aim may be taken where a bird or other game suddenly appears in the vicinity of the hunter.

A further object of the invention is to provide a gun support of the type described, which is of light weight, easy and cheap to manufacture, and which can be quickly and easily attached to or disconnected from the ordinary clothing of the hunter such as the waist band, belt or pocket.

Various other objects and advantages will appear as the description of the invention proceeds.

The details of the invention are hereinafter particularly described.

In the accompanying drawing:

Figure 1 is a perspective view showing a sportsman carrying a gun supported by a device embodying my invention.

Figure 2 is a front elevation of the device, the belt or strap by which the device is to be secured to the person, being in perspective and partly broken away.

Figure 3 is a top view, the attaching belt being partly broken away.

Figure 4 is a cross section taken on the broken line 4—4 of Figure 3.

Figure 5 is a front elevation illustrating the use of the gun rest independent of the pad, and Figure 6 is an end view of the same.

Similar reference characters indicate like parts throughout the several views.

10 indicates a pad provided with a pocket 11 on one side and a loop 12 on the opposite side. This pad may be made of any desired shape or material, but I prefer that it be flexible and formed of a comparatively thick piece of fibrous material 13, having a facing of leather 14, and backing of similar material 15, joined together in any suitable manner, such as by stitching 16 around the outer edge; the loop 12 being attached to the backing 15, preferably by stitching 17. The pocket 11 may be attached to the front leather facing 14 in a similar manner, but I prefer to form this pocket by cutting a transverse slit 18 in the upper part of the leather front 14, and making a semicircular line of stitching 19 through the entire pad to form the bottom of the pocket, although the pad may be of one piece of leather or similar material with the pocket 11, attached in any suitable manner to one side, and the loop 12 to the other side.

The member into which gun 20 is to be placed, is preferably cut out of a flat piece of metal, providing a vertical tongue 21, broadened at its lower half, which tongue is adapted to be passed thru the slit 18 in the front leather facing 14, with its lower edge resting upon the bottom of the pocket 11 formed by the semicircular line of stitching 19, the metal above and at each side of the tongue bearing against the front of the pad outside the pocket, the lower half of the metal out of which this member is made being bent upwardly and outwardly as shown, forming a gun rest 22, having a central opening 23. This bent-up portion is preferably slightly inclined, or somewhat higher at one end than at the other, so that when the gun is placed therein, it will be held with the barrel of the gun somewhat raised at the front, or inclined as illustrated in Figure 1. The trigger guard 24 of the gun 20 passes thru the opening 23 in the gun rest 22, so that the portion of the gun barrel, adjacent thereto, is seated smoothly and evenly in the seat formed by the upwardly and outwardly curved portion of the gun rest without liability to slide in either direction, while there is no danger of the trigger being caught or coming into contact with any portion of the gun rest in placing or removing the gun quickly into position therein, or therefrom.

A belt or strap 25 is passed thru the loop 12 on the back of the pad 10, by which the device is supported upon the body of the sportsman, as illustrated in Figure 1, said strap being provided with any suitable fastening means, such as a buckle 26.

While it is preferable to employ the pad 10, it will be readily understood that the pad may be dispensed with, as the gun rest may be attached to the ordinary belt or strap worn by hunters or to one of the pockets of the hunting vest by simply passing the tongue 21 over and behind the belt 27 or pocket, and pushing it downward so that the belt or pocket passes into the vertical slots 28 at each side of the tongue 21 as illustrated in Figures 5 and 6. The broadened portion of the tongue 21 engages the belt in the slots 28 and prevents accidental removal of the rest from the belt.

My invention provides a gun rest for hunters, which relieves his arms from the weight of the gun, and supports it in such position and manner that he is at all times ready to take quick aim should game suddenly appear in his vicinity.

While my gun support has been described as being made from a single piece of metal, it will be obvious that it could be made of two or more pieces suitably secured together and that the tongue 21 need not be formed of the material from the opening 23 but may be formed separately from the rest 22 or by bending over the top of the back portion of the rest 22 to form a suitable flat hook to slip onto the waist band or belt or into the pocket. The opening 23 may also be omitted and the gun carried with the forward hand grip or the barrel supported by the rest 22 and with the trigger guard 24 outside of the rest 22. When in this position the finger may be carried on the trigger to permit quicker shooting.

All these and various other modifications and changes may be made without departing from the spirit of the invention or the scope of the appended claims.

I claim as my invention:

1. A gun rest having a curved seat for the stock of a gun provided with a central opening for the passage of the trigger guard, and having a vertical tongue to engage a belt of ordinary character, and support the gun rest thereupon.

2. A gun rest formed from one piece of material having a curved seat for the stock of a gun provided with a central opening for the passage of the trigger guard with a vertical tongue, and a vertical slot on each side thereof, said tongue being adapted to engage a belt in such manner that the belt enters said slots at each side thereof.

3. A gun rest for sportsmen's use formed from a single flat piece of metal cut out to provide a vertical tongue and a forwardly projecting seat for a gun barrel formed by the bending outwardly and upwardly the lower portion of said piece of metal after the tongue has been cut to shape, said seat being provided with an opening for the passage of the trigger guard of a gun.

4. A device for hunter's use comprising a body pad provided with a pocket, a gun rest supported in said pocket and means for attaching the device to the body of the hunter.

5. A gun rest comprising a pad provided with a pocket, a concave seat for the barrel of a gun supported in said pocket, and means for attaching the device to the person.

6. A device of the character described comprising a pad provided with a pocket, a gun rest having a portion adapted to be received in said pocket and with an upwardly curved portion outside the pocket forming a seat for the barrel of the gun and provided with an opening for the passage of the trigger guard of the gun, and means for attaching the device to the person.

7. A sheet metal gun rest formed from one piece of material having a curved seat for the stock of a gun, a relatively stiff vertical tongue, a vertical slot on each side thereof, a relatively stiff plate on the outer side of each slot, in substantially the plane of said tongue, and adapted to remain in said plane, said tongue being adapted to engage a belt in such manner that the belt enters said slots at each side thereof.

8. A gun rest having a curved seat for the stock of a gun, a vertical tongue, and a vertical slot on each side thereof, said tongue being adapted to engage a belt in such manner that the belt enters said slots at each side thereof and an enlargement on said tongue below said slots to retain the rest upon the belt.

9. A gun rest adapted for quick attachment to or detachment from the clothing of the wearer, comprising a curved seat for supporting the gun, a substantially vertical hook portion for attaching the rest to the belt or clothing of the user, and means forming part of the said hook portion to prevent accidental displacement of the rest from the clothing when the gun is removed therefrom.

GEORGE THOMPSON.